(12) United States Patent
Watariuchi

(10) Patent No.: US 9,781,287 B2
(45) Date of Patent: Oct. 3, 2017

(54) INFORMATION PROCESSING APPARATUS, METHOD OF CONTROLLING INFORMATION PROCESSING APPARATUS, AND PROGRAM

(71) Applicant: CANON KABUSHIKI KAISHA, Tokyo (JP)

(72) Inventor: Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/175,481

(22) Filed: Jun. 7, 2016

(65) Prior Publication Data
US 2016/0373602 A1 Dec. 22, 2016

(30) Foreign Application Priority Data
Jun. 16, 2015 (JP) ................................ 2015-120996

(51) Int. Cl.
H04N 1/00 (2006.01)
(52) U.S. Cl.
CPC ..... *H04N 1/00973* (2013.01); *H04N 1/00244* (2013.01); *H04N 2201/0094* (2013.01)
(58) Field of Classification Search
USPC ................................ 358/1.1–3.29
See application file for complete search history.

(56) References Cited

U.S. PATENT DOCUMENTS

| | | | | |
|---|---|---|---|---|
| 7,000,230 B1 * | 2/2006 | Murray | ...................... | G06F 8/61 717/170 |
| 7,779,027 B2 * | 8/2010 | James | ....................... | G06F 8/60 707/769 |
| 2016/0006886 A1 * | 1/2016 | Sato | .................... | H04N 1/00965 358/1.15 |
| 2016/0034264 A1 * | 2/2016 | Hayashi | .................... | G06F 8/61 717/178 |
| 2016/0150116 A1 * | 5/2016 | Watariuchi | ......... | H04N 1/00949 358/1.15 |

FOREIGN PATENT DOCUMENTS

JP    4039439 B2    1/2008

\* cited by examiner

*Primary Examiner* — Marcellus Augustin
(74) *Attorney, Agent, or Firm* — Canon U.S.A., Inc. IP Division

(57) ABSTRACT

An information processing apparatus capable of adding a function by an extension program includes a registration unit, a setting unit, an execution unit, and a determination unit. The registration unit registers information on the extension program having an interface defined for each type of function. The setting unit sets a use condition of the extension program. The execution unit executes a process sequence by combining a plurality of extension programs according to a definition file defining the process sequence including a plurality of steps. The determination unit dynamically determines, when the process sequence is executed by the execution unit, extension programs that execute the respective steps of the process sequence according to information on the extension programs registered in the registration unit and the use conditions of the extension program set in the setting unit.

11 Claims, 15 Drawing Sheets

| No. | FUNCTION PROVIDER ID | NAME | FUNCTION TYPE | FUNCTION PROVIDER INTERFACE | VALUES ALLOWED TO BE SET |
|---|---|---|---|---|---|
| 1 | NORMAL_SCAN | STANDARD SCAN | SCAN | IScan Provider | DOCUMENT_FORMAT=PDF,JPG,XPS,PPTX ORIGINAL_TYPE=PHOTO,TEXT,TEXT_PHOTO ... |
| 2 | EASY_SCAN | SIMPLE SCAN | SCAN | IScan Provider | DOCUMENT_FORMAT=PDF,JPG ORIGINAL_TYPE=PHOTO,TEXT ... |
| 3 | OCR_DEVICE | BUILT-IN OCR | OCR | IOcrProvider | LANG=EN,JA,FR,IT,GE,ES ... |
| 4 | OCR_WEB | Web OCR | OCR | IOcrProvider | LANG=EN,JA,FR,IT,GE,ES,KR,TW,ZH ... |
| 5 | SEND_FTP | FTP TRANSMISSION | SEND_FILE | ISendFile Provider | ... |
| 6 | BASIC_PREVIEW | PREVIEW | PREVIEW | IPreview Provider | ... |
| ... | | | | | |

| No. | FUNCTION TYPE | ORDER OF PRIORITY | DISABLED |
|---|---|---|---|
| 1 | SCAN | NORMAL_SCAN, EASY_SCAN | . . . |
| 2 | OCR | OCR_DEVICE, OCR_WEB | . . . |
| 3 | SEND_FILE | SEND_FTP | . . . |
| . . . | . . . | . . . | . . . |

| No. | ROLE | FUNCTION TYPE | ORDER OF PRIORITY | DISABLED |
|---|---|---|---|---|
| 1 | Administrators | . . . | . . . | . . . |
| 2 | Power Users | . . . | . . . | . . . |
| 3 | Normal Users | . . . | . . . | . . . |
| 4 | Guest Users | OCR | . . . | OCR_WEB |
| . . . | . . . | . . . | . . . | . . . |

| No. | USER | FUNCTION TYPE | ORDER OF PRIORITY | DISABLED |
|---|---|---|---|---|
| 1 | tanaka | SCAN | EASY_SCAN, NORMAL_SCAN | . . . |
| 2 | takahashi | OCR | OCR_WEB, OCR_DEVICE | . . . |
| 3 | yamada | . . . | . . . | . . . |
| 4 | watanabe | . . . | . . . | . . . |
| . . . | . . . | . . . | . . . | . . . |

FIG. 10

```
1010 ── <Workflow id="..."name="SCAN & OCR THEN FTR TRANSMISSION">
1020 ──   <FP no="1"type="SCAN">
1021 ──     <Condition>
1022 ──       <Required item="DOCUMENT_FORMAT"value="PDF" />
1023 ──       <Optional item="ORIGINAL_TYPE"value="TEXT" />
            </Condition>
1024 ──     <Action no="1"method="showSettingUI">
1025 ──       <Parameter>
                ...value set for showSettingUI...
              </Parameter>
            </Action>
1026 ──     <Action no="2"method="doScan">
              <Parameter>
                ...value set for doScan...
              </Parameter>
1027 ──       <Output type="Document"id="foo" />
            </Action>
          </FP>
1030 ──   <FP no="2"type="OCR">
            <Condition>
1031 ──       <Required item="LANG"value="JA" />
            </Condition>
1032 ──     <Action no="1"method="doOCR">
1033 ──       <Input type="Document"src="foo" />
              <Parameter>
                ...value set for doOCR...
              </Parameter>
1034 ──       <Output type="String"id="bar" />
            </Action>
          </FP>
1040 ──   <FP no="3"id="SEND_FTP">
            <Action no="1"method="doSend">
1041 ──       <Input type="Document"src="foo" />
1042 ──       <Input type="String"src="bar" />
              <Parameter>
                ...value set for doSend...
              </Parameter>
            </Action>
          </FP>
        </Workflow>
```

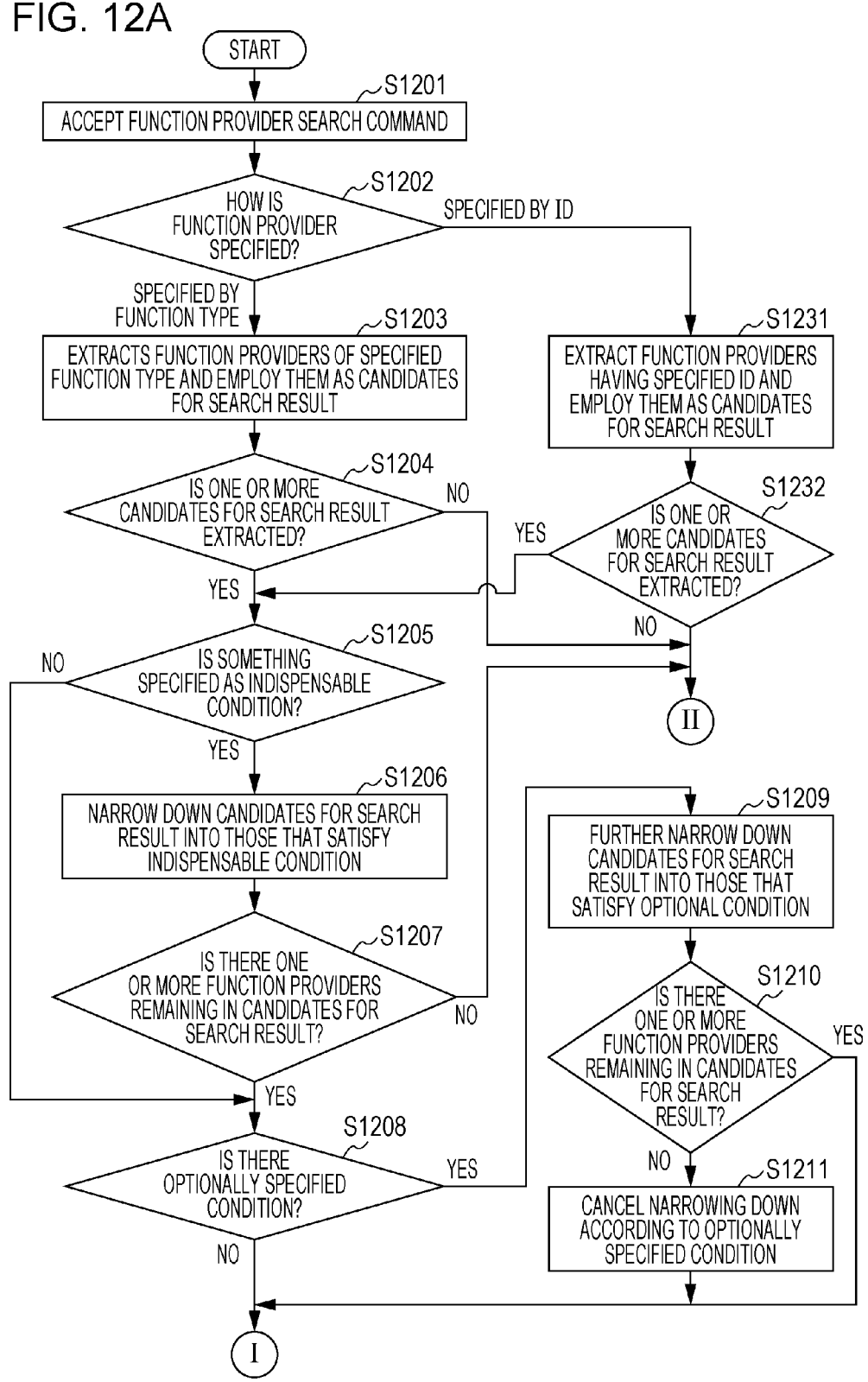

FIG. 13

```
public interface IScanProvider {
        public boolean showSettingUI(Parameter);
        public Document doScan(Parameter);
        public Document doScanWithSettingUI(Parameter);
}
public interface IOcrProvider {
        public String doOCR(Document, Parameter);
}
public interface ISendFileProvider {
        public boolean showSettingUI(Parameter);
        public boolean doSend(Document, String, Parameter);
        public boolean doSendWithSettingUI(Document, String, Parameter);
}
public interface IPreviewProvider {
        public boolean doPreview(Document, Parameter);
}
```

INFORMATION PROCESSING APPARATUS, METHOD OF CONTROLLING INFORMATION PROCESSING APPARATUS, AND PROGRAM

BACKGROUND OF THE INVENTION

Field of the Invention

The present invention relates to an information processing apparatus, a method of controlling an information processing apparatus, and a program.

Description of the Related Art

In recent years, as for an image forming apparatus installed in an office, a system capable of extending functions of the image forming apparatus has been popular. The extending of functions (hereinafter, such functions are referred to as extension functions) is realized using a software program (extension software), and functions may be extended not only when shipped from a factory but also after the system is installed or when the system is in operation. A specific example of such a system is Multifunctional Embedded Application Platform (MEAP) (registered trademark) available from CANON KABUSHIKI KAISHA.

It is known to download an extension software selected by a user from an external server and install it, thereby extending a function of an image forming apparatus (see, for example, Japanese Patent Publication No. 4039439).

In particular, an extension software dedicated to a particular purpose is called application software (hereafter also referred to simply as an application). Each application realizes its purpose by using a function such as a facsimile function, a scanner function, a printer function, or the like of the image forming apparatus. The image forming apparatus is configured such that a plurality of applications are allowed to be installed depending on a purpose desired by a user.

In conventional techniques, a procedure for realizing a desired process is defined by an application program. Each application is capable of executing only a process defined in advance in a program. If it is desired to realize another process, it is necessary to modify the application program or use another application program, and thus it is difficult to flexibly extend functions.

SUMMARY OF THE INVENTION

The present invention provides a mechanism that makes it possible to flexibly extend a function of an information processing apparatus such as an image forming apparatus or the like.

According to an aspect of the present invention, an information processing apparatus capable of adding a function by an extension program includes a registration unit configured to register information on the extension program having an interface defined for each type of function, a setting unit configured to set a use condition of the extension program, an execution unit configured to execute a process sequence by combining a plurality of extension programs according to a definition file defining the process sequence including a plurality of steps, and a determination unit configured to dynamically determine, when the process sequence is executed by the execution unit, extension programs that execute the respective steps of the process sequence according to information on the extension programs registered in the registration unit and the use conditions of the extension program set in the setting unit.

In a case where a process sequence is executed by combining a plurality of extension programs according to a definition file defining the process sequence including a plurality of steps, each extension program that executes a step in the process sequence is dynamically determined according to information on registered extension programs and a use condition set for the extension program. Further features of the present invention will become apparent from the following description of exemplary embodiments with reference to the attached drawings.

BRIEF DESCRIPTION OF THE DRAWINGS

FIG. 7 is a diagram illustrating an example of a function provider information table.

FIGS. 9A to 9C are diagrams illustrating examples of function provider setting tables.

FIG. 10 is a diagram illustrating an example of a workflow definition file.

FIGS. 12A to 12C are flow charts illustrating a process of searching for a function provider in an MFP.

FIG. 13 is a diagram illustrating an example of a definition of a function provider interface.

DESCRIPTION OF THE EMBODIMENTS

The present invention is described in further detail below with reference to embodiments in conjunction with drawings.

Figure 1:
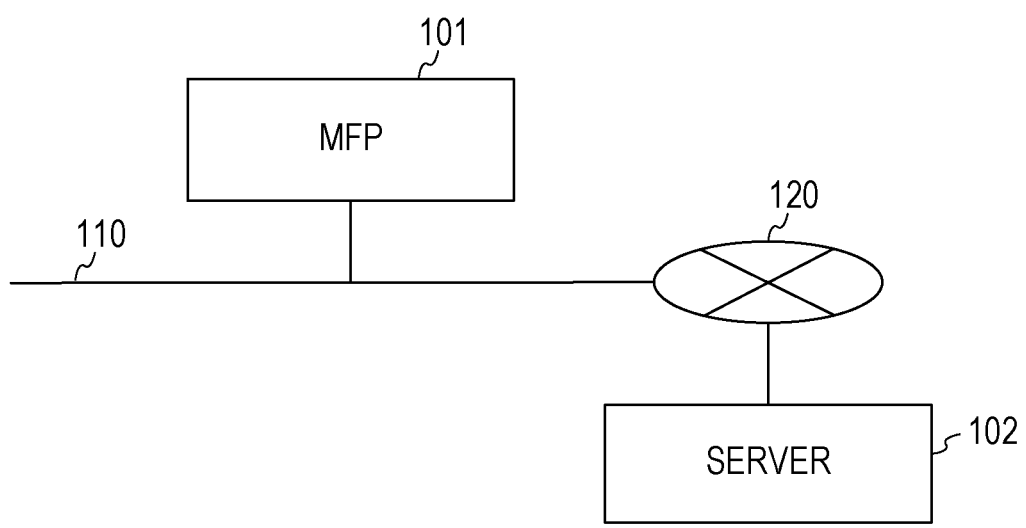
FIG. 1 is a diagram illustrating a configuration of a system including an image processing apparatus (MFP) according to an embodiment.

FIG. 1 is a diagram illustrating an example of a configuration of a system including an image processing apparatus, which is an example of an information processing apparatus, according to an embodiment.

The system according to the present embodiment includes a multi-function printer (MFP) 101 connected via a local area network (LAN) 110, and a server 102 connected via a wide area network (WAN) 120. An apparatus on the LAN 110 and an apparatus on the WAN 120 are capable of communicating with each other via the respective networks. Note that FIG. 1 illustrates a typical example of a network configuration, and each of the apparatuses may be located on either the LAN 110 or WAN 120.

The MFP 101 is a multifunction peripheral, that is, an image forming apparatus including a scanner and a printer. The MFP 101 includes a software platform for adding extension software and executing it on the apparatus. That is, the MFP 101 is an information processing apparatus capable of adding or extending a function using the extension software (extension program).

The server 102 is a server configured to perform various processes in cooperation with the MFP 101. More specifically, for example, the server 102 may be a file server configured to receive image data from the MFP 101, an application server configured to perform an optical character recognition (OCR) process in response to a process request received from the MFP 101, or the like. The number of servers 102 is not limited to one, but there may be provided a plurality of servers depending on purposes.

Figure 2:
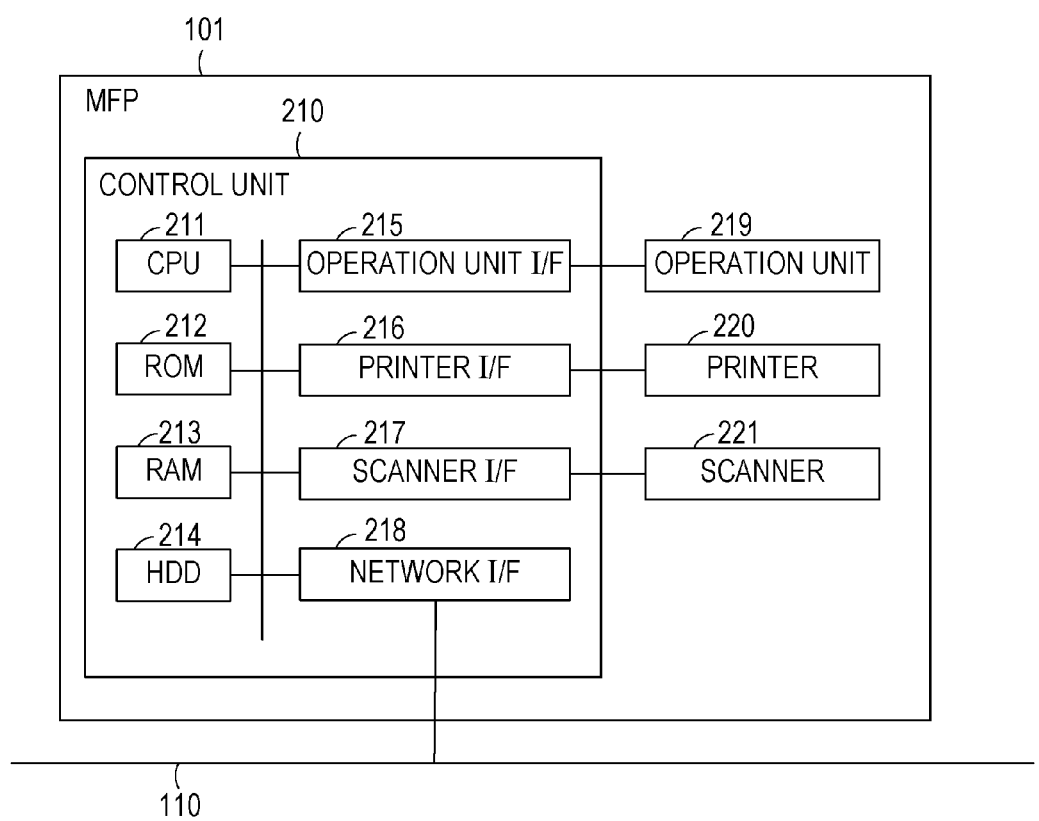
FIG. 2 is a diagram illustrating a hardware configuration of an MFP.

FIG. 2 is a block diagram illustrating an example of a configuration of the MFP 101.

A control unit 210 including a central processing unit (CPU) 211 controls an operation of the whole MFP 101.

The CPU 211 reads out a control program stored in a read-only memory (ROM) 212 or a hard disk drive (HDD) 214, and performs various control processes associated with reading, transmission, and the like by executing the control program. The ROM 212 stores various programs and data. The random-access memory (RAM) 213 is used as a main memory of the CPU 211 and also as a temporary storage area such as a work area or the like. The HDD 214 is a hard disk drive for storing image data and various programs including the installed extension software. Note that another type of storage apparatus such as a solid state drive (SSD) or the like may be used instead of or together with the HDD.

An operation unit interface (I/F) 215 connects an operation unit 219 to the control unit 210. The operation unit 219 includes a liquid crystal display unit having a touch panel function, a keyboard, and the like.

A printer I/F 216 connects a printer 220 and the control unit 210. Image data to be printed by the printer 220 is sent from the control unit 210 to the printer 220 via the printer I/F 216, and is printed on a recording medium by the printer 220.

A scanner I/F 217 connects a scanner 221 to the control unit 210. The scanner 221 reads an image on a document and generates image data thereof, and outputs the resultant image data to the control unit 210 via the scanner I/F 217.

A network I/F 218 connects the control unit 210 (MFP 101) to the LAN 110. The network I/F 218 transmits and receives various kinds of information to or from another apparatus on the LAN 110 or the WAN 120.

Figure 3:
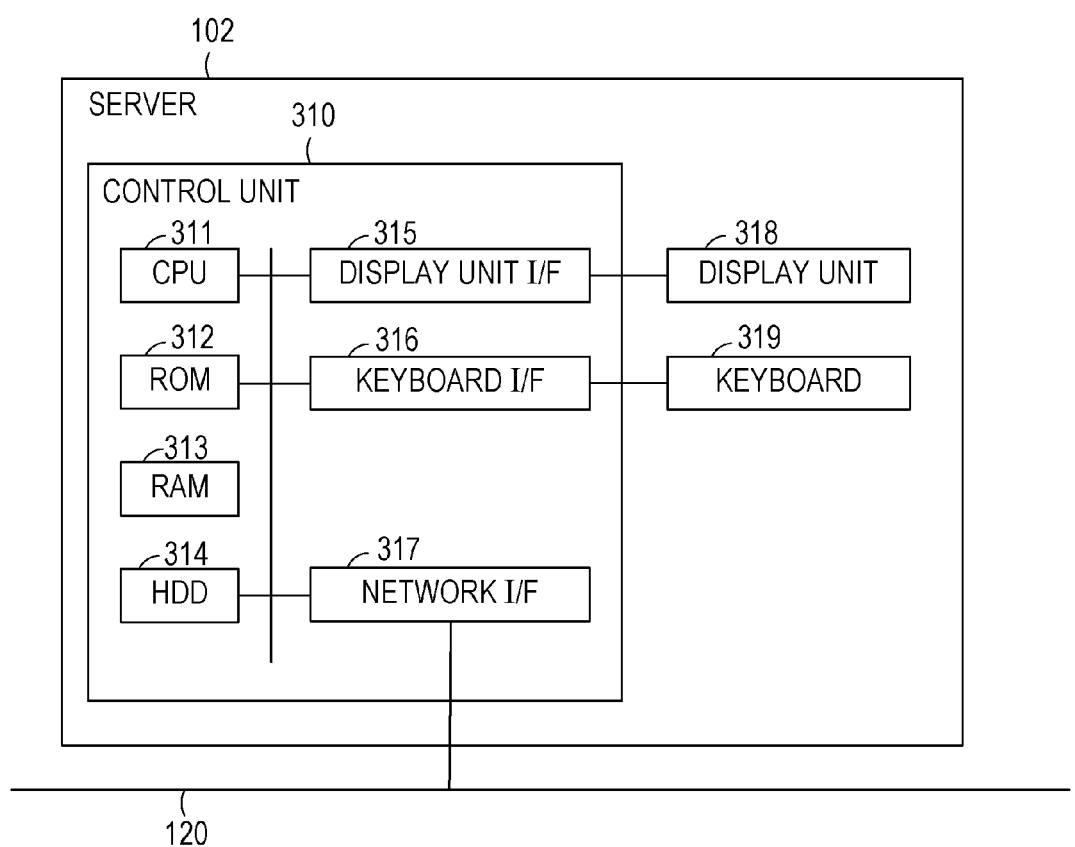
FIG. 3 is a diagram illustrating a hardware configuration of a server.

FIG. 3 is a block diagram illustrating an example of a configuration of the server 102.

A control unit 310 including a CPU 311 controls an operation of the whole server 102. The CPU 311 reads out a control program stored in a ROM 312 or an HDD 314, and executers various control processes. The ROM 312 stores various programs and data. The RAM 213 is used as a main memory of the CPU 311 and also as a temporary storage area such as a work area or the like. The HDD 314 stores various programs and data. Note that another type of storage apparatus such as an SSD or the like may be used instead of or together with the HDD.

A display unit I/F 315 connects a display unit 318 to the control unit 310. A keyboard I/F 316 connects a keyboard 319 and a pointing device such as a mouse to the control unit 310. The CPU 311 recognizes a command given by a user via the keyboard 319 or the like, and changes a screen displayed on the display unit 318 according to the recognized command.

A network I/F 317 connects the control unit 310 (server 102) to the WAN 120. The network I/F 317 transmits and receives various kinds of information to or from another apparatus on the LAN 110 or the WAN 120.

Figure 4:
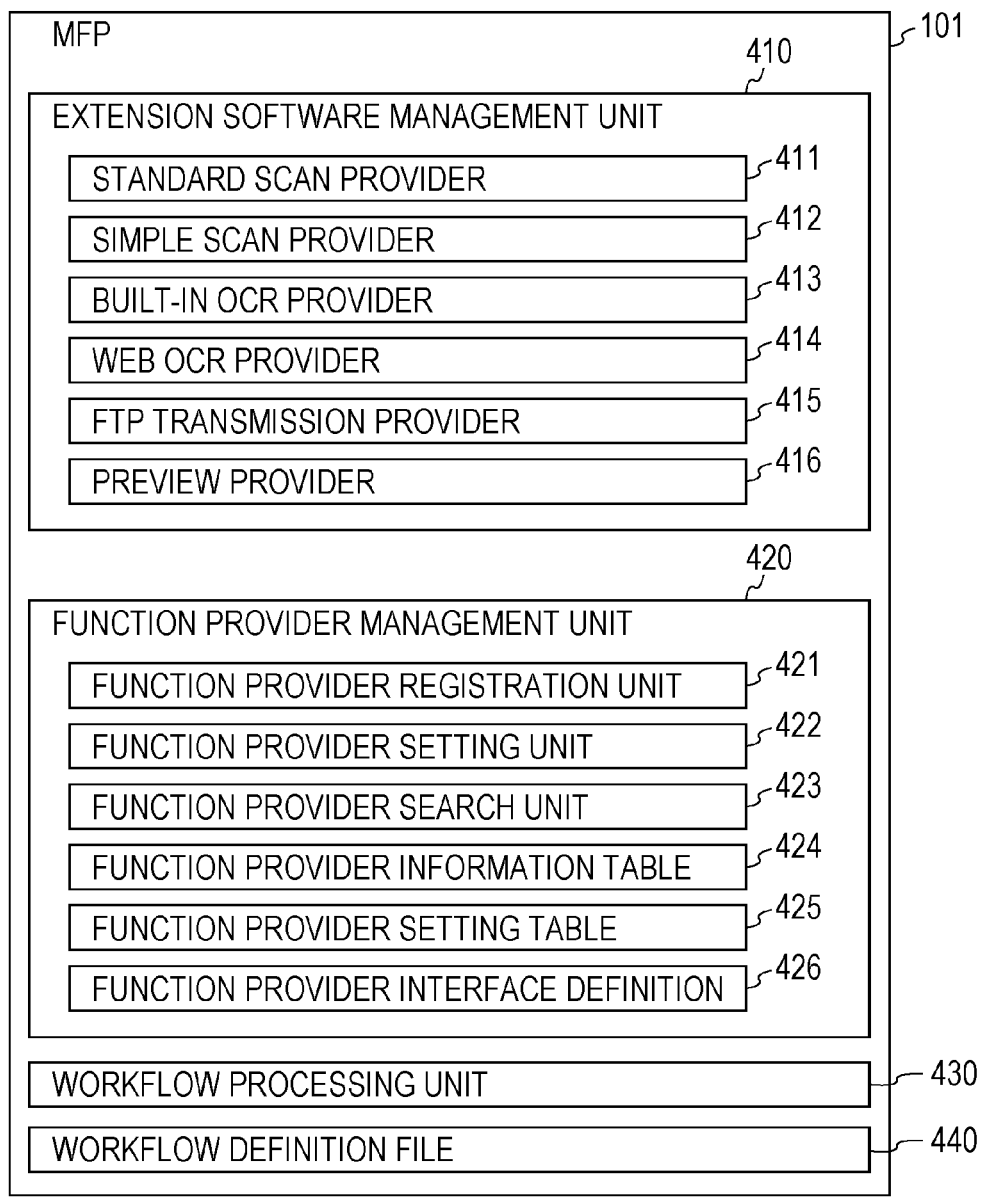
FIG. 4 is a diagram illustrating a software configuration of an MFP.

FIG. 4 is a diagram illustrating a software configuration of the MFP 101 according to the present embodiment. Each unit shown n FIG. 4 is a functional unit realized by the CPU 211 by reading a program (software) stored in the HDD 214 of the MFP 101 into the RAM 213 and analyzing and executing the read program.

An extension software management unit 410 is a software platform for running the extension software on the MFP 101. In the example shown n FIG. 4, six function providers 411 to 416 are installed as extension software in the MFP 101.

Note that the function providers are not applications, although the function providers are one type of extension software. Each application has, by itself, a complete sequence of processes starting with inputting and ending with outputting. In contrast, each function provider is specialized in a specific function such as inputting, outputting, or the like. Therefore, to perform a complete sequence of processes starting with inputting and ending with outputting by using function providers, it is necessary to combine a plurality of function providers.

For example, when a function of "scanning an image, displaying a preview, and then transmitting the result" is provided to a user, if the function is realized using an application program, three functions of "scan", "preview", and "transmission" are realized using a single application program. On the other hand, to provide the function described above by using function providers, it is necessary to use the following three function provides: a function provider to realize a scan function; a function provider to realize a preview function; and a function provider to realize a transmission function. Furthermore, to execute a complete sequence of functions realized by the three function providers, it is also necessary to use a workflow processing unit 430 and a workflow definition file 440 as described later.

In the case where applications are used, the applications are registered such that each application is displayed in the same horizontal line in which a corresponding function is displayed in a menu screen for calling functions (such as a copy function, a facsimile transmission function) originally provided on the MFP 101. An application is called in response to a command input by a user on the menu screen. In contrast, function providers are registered not in a menu screen but in a function provider management unit 420 described later. The function providers are called in response to a command issued by the workflow processing unit 430 via the function provider management unit 420.

The function providers are programmed so as to satisfy a rule defined by the function provider management unit 420 described later (hereinafter referred to as a function provider interface). The function provider interface is a software interface defining the rule in terms of inter-software communication. The function provider interfaces are determined separately for respective function types provided by the function provides. The function providers are called by the workflow processing unit 430 according to the function provider interfaces.

One function provider may have a plurality of different types of interfaces depending on purposes. For example, as for a function provider to realize a scan function, interfaces prepared for different purposes may be an interface for displaying a scan setting screen, and an interface for executing a scan job.

Furthermore, plurality of types of function providers may be installed in the MFP 101. In this case, the plurality of types function providers installed may be different or the same in terms of the function type. Function provides of the same function type have identical software interfaces. Therefore, in a case where function providers are the same in terms of the function type, extension software is allowed to perform software communication in a similar manner.

The standard scan provider 411 and the simple scan provider 412 are both function providers that provide a scan function (function type=scan). Function providers of function types of "scan" are generically referred to as scan providers. Each scan provider realizes a function provider interface (scan provider interface) defined for a function provider of a function type of scan".

The standard scan provider 411 has a scan setting screen for use by general users. The simple scan provider 412 has a scan setting screen for use by users who are not familiar with operations of the MFP 101.

OCR includes the conversion of text into machine-encoded text by reading data in printed form and identifying characters. A built-in OCR provider 413 and a Web OCR provider 414 are both function providers that provide an OCR function (function type=OCR). Function providers of function types of "OCR" are generically referred to as OCR providers. Each OCR provider realizes a function provider interface (OCR provider interface) defined for a function provider of a function type of "OCR". The built-in OCR provider 413 provides the OCR function by performing a character recognition process on the MFP 101. On the other hand, the Web OCR provider 414 provides the OCR function by calling a character recognition process provided by an external Web server (for example, the server 102).

A File Transfer Protocol (FTP) transmission provider 415 is a function provider that provides an FTP transmission function (function type=file transmission). Function providers of function types of "file transmission" are generically referred to as file transmission providers. The FTP transmission provider realizes a function provider interface (file transmission provider interface) defined for a function provider of a function type of "file transmission".

A preview provider 416 is a function provider that provides an image display function (function type=image display). Function providers of function types of "image display" are generically referred to as image display providers. The image display provider realizes a function provider interface (image display provider interface) defined for a function provider of a function type of "image display".

Each function provider realizes a function provider interface defined for its function type even in a situation in which there is no other function providers of the same function type in the MFP 101.

The six function providers 411 to 416 described above are merely examples, and the MFP 101 may include extension software serving as additional various function providers or some of the function providers described above may be removed.

The function provider management unit 420 is software that manages function providers installed in the MFP 101. The function provider management unit 420 includes a function provider registration unit 421, a function provider setting unit 422, a function provider search unit 423, a function provider information table 424, a function provider setting table 425, and a function provider interface definition 426.

In response to receiving a request from a function provider, the function provider registration unit 421 registers information on the function provider in the function provider information table 424 in terms of a function type of the function provider, a value allowed to be set, and/or the like. In response to receiving a request from a user, the function provider setting unit 422 performs setting associated with function providers in the function provider setting table 425 in terms of the order of priority of the function providers, whether the function provider is enabled or disabled for each user, and/or the like. Details of the function provider information table 424 will be described later with reference to FIG. 7, and details of the function provider setting table 425 will be described later with reference to FIG. 9.

When the function provider search unit 423 receives a function provider search condition from the workflow processing unit 430 described later, the function provider search unit 423 detects a function provider satisfying the search condition based on the information described in the function provider information table 424 and the function provider setting table 425. The function provider search unit 423 returns only one function provider as a search result. Therefore, in a case where a plurality of function providers satisfying the search condition are found, a function provider that is highest in the priority order is selected as the search result.

The function provider interface definition 426 defines function provider interfaces. Details of the function provider interface definition 426 will be described later with reference to FIG. 13.

The workflow processing unit 430 executes a plurality of processes as a sequence of processes by combining a plurality of function providers according to the workflow definition file 440 described below. In the present disclosure, the workflow denotes a process sequence including a plurality of steps realized by combining a plurality of function providers.

The workflow definition file 440 defines information associated with calling of a function provider in terms of search conditions of function providers to be called by the workflow processing unit 430, an order of calling, setting values applied to the called function providers, and/or the like. In the example shown in FIG. 4, only one workflow definition file is defined. However, the number of workflow definition files is not limited to one, but a plurality of workflow definition files may exist on the MFP 101. Details of the workflow definition file 440 will be described later with reference to FIG. 10.

Figure 5:
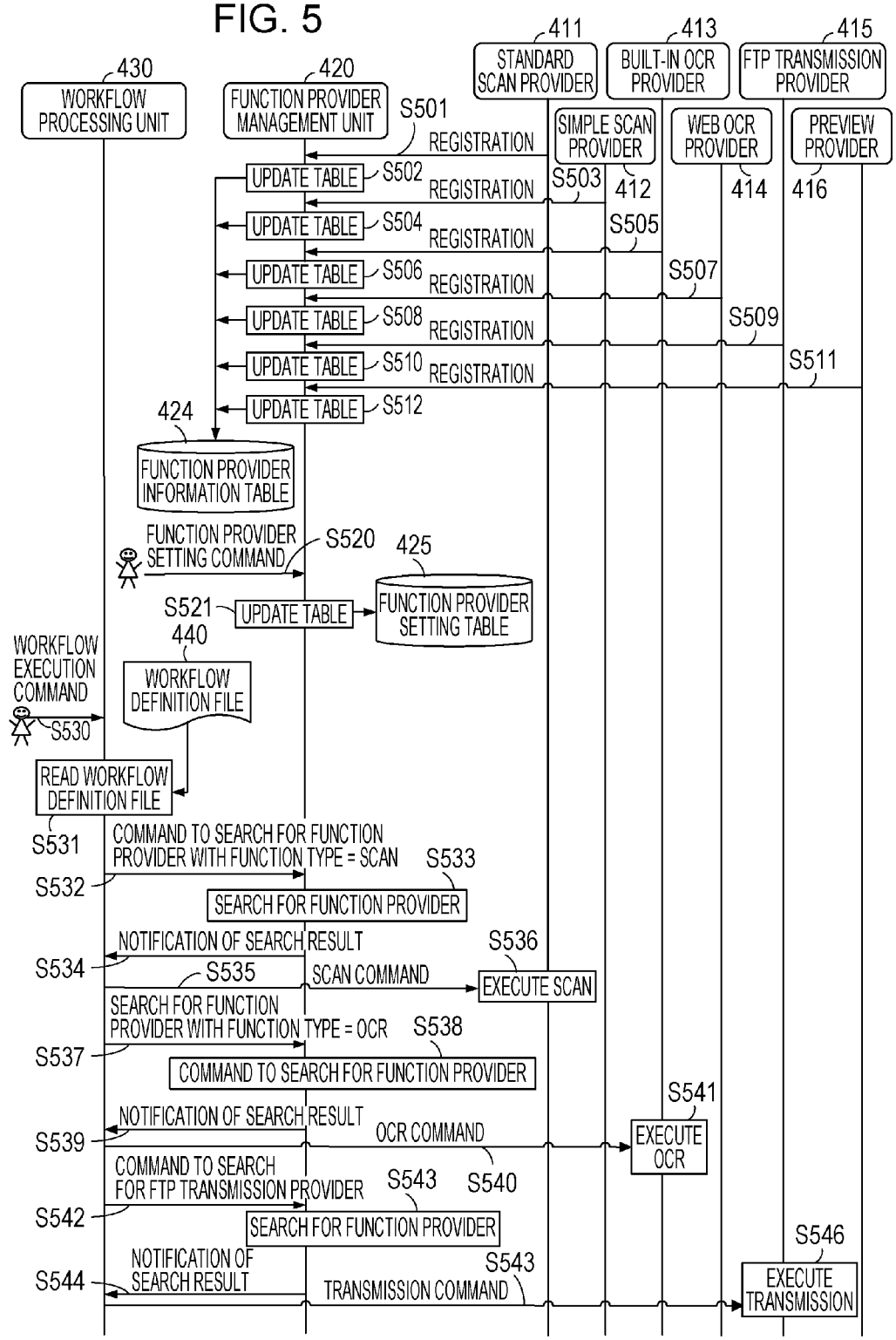
FIG. 5 is a diagram illustrating a process sequence associated with an image processing system.

FIG. 5 is a diagram illustrating a flow of a sequence of processes performed on the MFP 101 according to the present embodiment. The processes shown in FIG. 5 are executed by respective functional units realized by the CPU 211 by reading a program (software) stored in the HDD 214 of the MFP 101 into the RAM 213 and analyzing and executing the read program.

When the standard scan provider 411 starts, the standard scan provider 411 instructs the function provider management unit 420 to register the standard scan provider 411 as a function provider (S501). This instruction includes information necessary in the registration.

In response to receiving this registration command, the function provider management unit 420 stores registration information, included in the instruction, associated with the function provider in the function provider information table 424 (S502).

As with the standard scan provider 411, when the function providers 412 to 416 start, they instruct the function provider management unit 420 to register them as function providers (S503, S505, S507, S509, S511).

When the function provider management unit 420 receives these registration commands, the function provider management unit 420 stores registration information, included in the instructions, associated with the function providers in the function provider information table 424 (S504, S506, S508, S510, S512).

Next, when the function provider management unit 420 receives a function provider setting command from a user (S520), the function provider management unit 420 updates the function provider setting table 425 according to the command content (S521).

Next, when the workflow processing unit 430 receives a workflow execution command from a user (S530), the workflow processing unit 430 reads a workflow definition file 440 corresponding to the received execution command (S531). Herein, let it be assumed by way of example that the workflow definition file 440 defines that "a function provider of a function type of scan", "a function provider of a function type of OCR", and "a FTP transmission provider" are sequentially executed. In the workflow definition file, it may be allowed to specify a function provider to be executed by specifying a function type, or uniquely specifying a particular function provider.

The workflow processing unit 430 instructs the function provider management unit 420 to search for a "function provider whose function type is scan", that is, a scan provider (S532). The command includes a search condition defined in the workflow definition file 440. In response to receiving the search command, the function provider management unit 420 extracts a scan provider satisfying the search condition based on the information described in the function provider information table 424 and the function provider setting table 425 (S533). In a case where a plurality of scan providers satisfying the search condition are found, the function provider management unit 420 selects, as a search result, a scan provider that is highest in the priority order. The function provider management unit 420 notifies the workflow processing unit 430 of the result of the search of the scan provider (S534).

In response to receiving this search result, the workflow processing unit 430 instructs the scan provider indicated by the search result to perform scanning (S535). In this case, the workflow processing unit 430 does not care about whether the search result indicates the standard scan provider 411 or the simple scan provider 412. Regardless of whether the scan provider is the standard scan provider 411 or the simple scan provider 412, they are the same in that both are scan providers. Therefore, the workflow processing unit 430 is allowed to issue a scan command according to the scan provider interface without having to detect whether the scan provider is the standard scan provider 411 or the simple scan provider 412.

When the scan provider (the standard scan provider 411 in the example shown in FIG. 5) receives the scan command from the workflow processing unit 430, the scan provider performs scanning according to the command (S536).

Next, the workflow processing unit 430 instructs the function provider management unit 420 to search for a "function provider whose function type is OCR", that is, an OCR provider (S537). The command includes a search condition defined in the workflow definition file 440. When the function provider management unit 420 receives the search command, the function provider management unit 420 extracts an OCR provider satisfying the search condition based on the information described in the function provider information table 424 and the function provider setting table 425 (S538). In a case where a plurality of OCR providers satisfying the search condition are found, an OCR provider that is highest in the priority order is selected as the search result. The function provider management unit 420 notifies the workflow processing unit 430 of the result of the search of the OCR provider (S539).

In response to receiving the search result, the workflow processing unit 430 instructs the OCR provider indicated by the search result to perform an OCR process (S540).

When the OCR provider (the built-in OCR provider 413 in the example shown in FIG. 5) receives the OCR command from the workflow processing unit 430, the OCR provider performs the OCR process according to the command (S541).

Next, the workflow processing unit 430 instructs the function provider management unit 420 to search for the FTP transmission provider 415 (S542). The function provider management unit 420 notifies the workflow processing unit 430 of the search result of the FTP transmission provider 415 (S543).

In response to receiving the search result, the workflow processing unit 430 instructs the FTP transmission provider 415 indicated by the search result to perform a transmission process (S545).

When the FTP transmission provider 415 receives the transmission command from the workflow processing unit 430, the FTP transmission provider 415 performs the transmission processing according to the command (S546).

Figure 6:
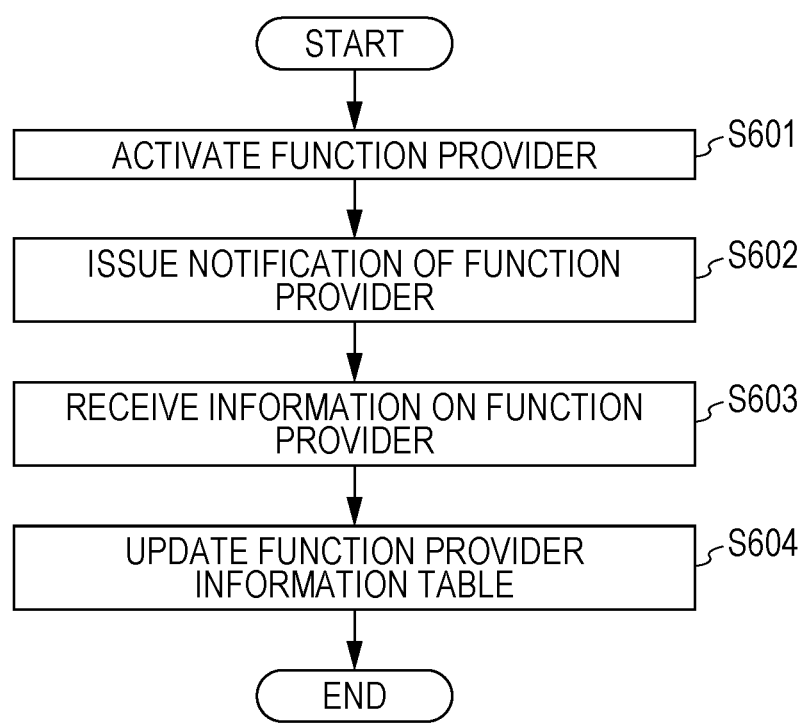
FIG. 6 is a flow chart illustrating a process of updating a function provider information table in an MFP.

FIG. 6 is a flow chart illustrating a process performed by each function provider in a corresponding one of steps S501 to S512 shown in FIG. 5 when each function provider is started. The process shown in this flow chart is realized by the CPU 211 by loading a program stored in the HDD 214 of the MFP 101 into the RAM 213 and analyzing and executing the loaded program.

First, in response to a trigger such as starting of the MFP 101 or a command issued by a user, the extension software management unit 410 activates function providers (S601).

Each of the activated function providers (function providers 411 to 416 in the example shown in FIG. 4) notifies the function provider registration unit 421 of information thereof (in terms of the function type, allowed setting values, and the like) and instructs the function provider registration unit 421 to register it as a function provider (S602).

When the function provider registration unit 421 receives the registration command from a function provider (S603), the function provider registration unit 421 stores the received information in the function provider information table 424 thereby updating the function provider information table 424 (S604).

FIG. 7 is a diagram illustrating an example of the function provider information table 424.

As illustrated in FIG. 7, the function provider information table 424 describes information of each function provider in terms of a function provider identification (ID) uniquely identifying the function provider, a name of the function provider, a function type, a function provider interface, a value allowed to be set to the function provider, and the like.

Figure 8:
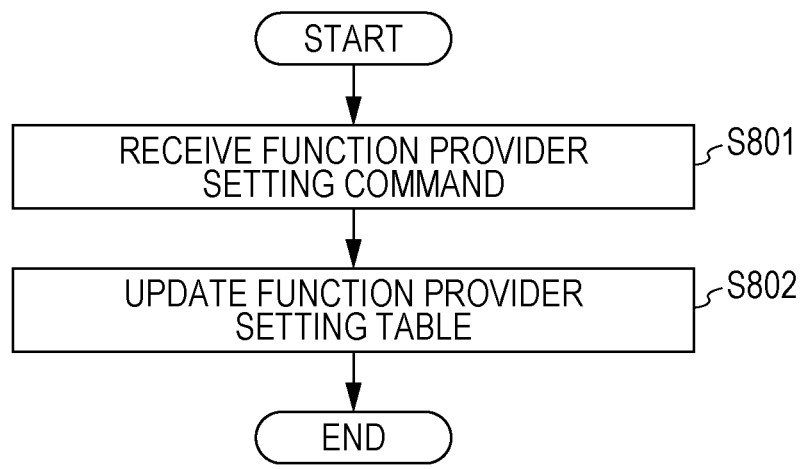
FIG. 8 is a flow chart illustrating a process of setting a function provider setting table in an MFP.

FIG. 8 is a flow chart illustrating a process in S520 and S521 shown in FIG. 5. The process shown in this flow chart is realized by the CPU 211 by loading a program stored in the HDD 214 of the MFP 101 into the RAM 213 and analyzing and executing the loaded program.

When the function provider setting unit 422 receives a function provider setting command from a user (S801), the function provider setting unit 422 updates the function provider setting table 425 according to the content of the command (S802).

FIGS. 9A to 9C are diagrams illustrating examples of the function provider setting table 425. Note that the function provider setting table 425 includes three sub-tables shown respectively in FIGS. 9A, 9B, and 9C.

FIG. 9A illustrates a sub-table (common setting table) in terms of setting of function providers applied in common to all users using the MFP 101. More specifically, the common setting table describes setting in terms of use conditions of function providers such that the order of priority and a function provider specified as being disabled are defined for each function type. Regarding the order of priority, function provider IDs are described in the order from the highest to the lowest priority. For example, for the function type "scan", the order of priority is set such that "NORMAL_SCAN" is highest and "EASY_SCAN" is lowest. In a case where a particular function provider is described in a field of "disabled", this particular function provider is specified as being disabled.

FIG. 9B illustrates a sub-table (role setting table) in terms of setting of function providers defined individually for each role of a user. The role setting table defines the order of priority and disabled function providers for each role and for each function type. For example, for a user of a role of "Guest Users", a function provider of "OCR WEB" is disabled for a function type of "OCR".

FIG. 9C illustrates a sub-table (user setting table) defining function providers individually for each user. The user setting table defines the order of priority and disabled function providers individually for each user and for each function type. For example, for a user "tanaka", the order of priority for a function type "SCAN" is defined such that "EASY_SCAN" is highest and "NORMAL_SCAN" is lowest.

FIG. 13 is a diagram illustrating an example of a definition of a function provider interface according to the present embodiment. Although in the present embodiment the function provider interface is described by way of example in a program source code format, the function provider interface may be described in another format.

In FIG. 13, 1301 denotes a definition of a scan provider interface, in which three interfaces "showSettingUI", "doScan", and "doScanWithSettingUI" are defined. Any scan provider needs to include the three interfaces defined in 1301.

The interface "showSettingUI" is for displaying a scan setting screen, via which Parameter is received and a result expressed in Boolean (true/false value) is returned. When a user finally determines scan setting, "true" is returned. If a user cancels the scan setting, "false" is returned. The variable "Parameter" is a setting value which is defined in the workflow definition file 440 and which is used when the interface is called.

The interface "doScan" is for executing scanning, via which Parameter is received and a result is returned in a data format Document. The interface "doScan" executes scanning using a value set by a user via "showSettingUI" or a setting value specified by Parameter.

The interface "doScanWithSettingUI" executes the scanning using a value finally determined by a user via the displayed scan setting screen.

Similarly, 1302 denotes a definition of an OCR provider interface, 1303 denotes a definition of a file transmission provider interface, and 1304 denotes a definition of a preview provider interface. As described above, in the function provider interface definition, interfaces of the respective function providers are defined (in terms of the name, the input, and the output).

FIG. 10 is a diagram illustrating a specific example of a workflow definition file according to the present embodiment. In the present embodiment, the workflow definition file is described by way of example in the Extensible Markup Language (XML) format. However, the format is not limited to XML, but the file may be described in another format.

A Workflow tag 1010 indicates that the following description is of the definition of the workflow.

A function provider (FP) tag 1020 is a sub-element of the Workflow tag 1010 and defines information in terms of a function provider executed in the workflow. In an FP tag 1020, an attribute of "no" defines the order of the execution of function providers in the workflow, where no="1" indicates that the function provider of interest is to be executed first. In the FP tag 1020, an attribute of "type" defines a function type of the function provider to be executed, where type="SCAN" indicates that the function provider of interest is a scan provider.

A Condition tag 1021 is a sub-element of the FP tag 1020 in which a search condition of the scan provider is defined by sub-elements Required tag 1022 and Optional tag 1023.

The Required tag 1022 defines an "indispensable condition" in the search of the scan provider such that the scan provider has to allow "PDF" to be set as a setting value of "FILE_FORMAT (file format)".

The Optional tag 1023 defines "optional condition" in the search of the scan provider. In the present example, it is defined that a scan provider capable of setting "TEXT" as a setting value of "ORIGINAL_TYPE (document type)" is given a high priority in use.

The difference between "indispensable condition" and "optional condition" is described below.

In the function provider search process, the indispensable condition is a condition that needs to be satisfied. If there is no function provider that satisfies the indispensable condition, then "no function provider" is the search result. On the other hand, when an optional condition is specified, a function provider satisfying the optional condition is to be used with high priority. In a case where there is no function provider satisfying the optional condition, the optional condition is removed from the search condition. As described above, in the workflow definition file 440, it is allowed to specify one or both of the indispensable condition and the optional condition as conditions to be satisfied by function providers that execute respective steps defined in the workflow.

An Action tag 1024 is a sub-element of the FP tag 1020 and defines information in terms of calling a function provider. In the Action tag, an attribute "no" defines the execution order among function providers defined in the FP tag, and an attribute "method" defines an interface to be called. In the present example, the Action tag 1024 defines that "showSettingUI" is to be called first in the execution of the scan provider.

A Parameter tag 1025 is a sub-element of the Action tag 1024 and defines a setting value to be transferred when an interface (showSettingUI) defined in the Action tag 1024 is called.

An Action tag 1026 is a sub-element of the FP tag 1020 and defines that "doScan" is to be called second in the execution of the scan provider.

An Output tag 1027 is a sub-element of the Action tag 1026 and defines an output of a result of the execution of "doScan". In an Output tag 1027, a "type" attribute defines that the output type is "Document", and an "id" attribute defines that "foo" is an ID uniquely identifying an output data.

In an FP 1030 tag, a "no" attribute and a "type" attribute define that an OCR provider is a function provider to be executed second. A Required tag 1031 defines an indispensable condition of the OCR provider. In the present example, it is defined that the OCR provider needs to satisfy the condition that "JA (Japanese)" is allowed to be set as a setting value of "LANG (recognition language)".

An Action tag 1032 is a sub-element of the FP tag 1030 and defines that "doOCR" is to be called first in the execution of the OCR provider.

An Input tag 1033 defines an input of "doScan". In the present example, it is defined that data in the "Document" format identified by an ID of "foo" is to be received. The data with the ID "foo" is output data of "doScan" defined in the Output tag 1027. That is, the OCR provider is defined such that scan data output from the scan provider is received in the "Document" format.

An Output tag 1034 defines the output of "doOCR". In the present example, the "type" attribute defines that the output format is "String (character string)" and the "id" attribute defines that an ID "bar" uniquely identifies the output data.

In an FP 1040 tag, the no attribute and the "id" attribute define that a FTP transmission provider is a function provider to be executed in the third step. The FP tag may specify a function provider by a function type by using a "type" attribute as with the FP tags 1020 and 1030, or may uniquely specify a function provider by using an "id" attribute as with the FP tag 1040.

An Input tag 1041 defines an input in calling "doSend" in the FTP transmission provider. In the present example, it is defined that data of the type "Document" identified by an ID "foo" is received from the output of "doScan".

An Input tag 1042 defines an input in calling doScan in the FTP transmission provider. In the present example, data of the type "String" identified by an ID "bar" is received from the output of "doOCR".

Figure 11:
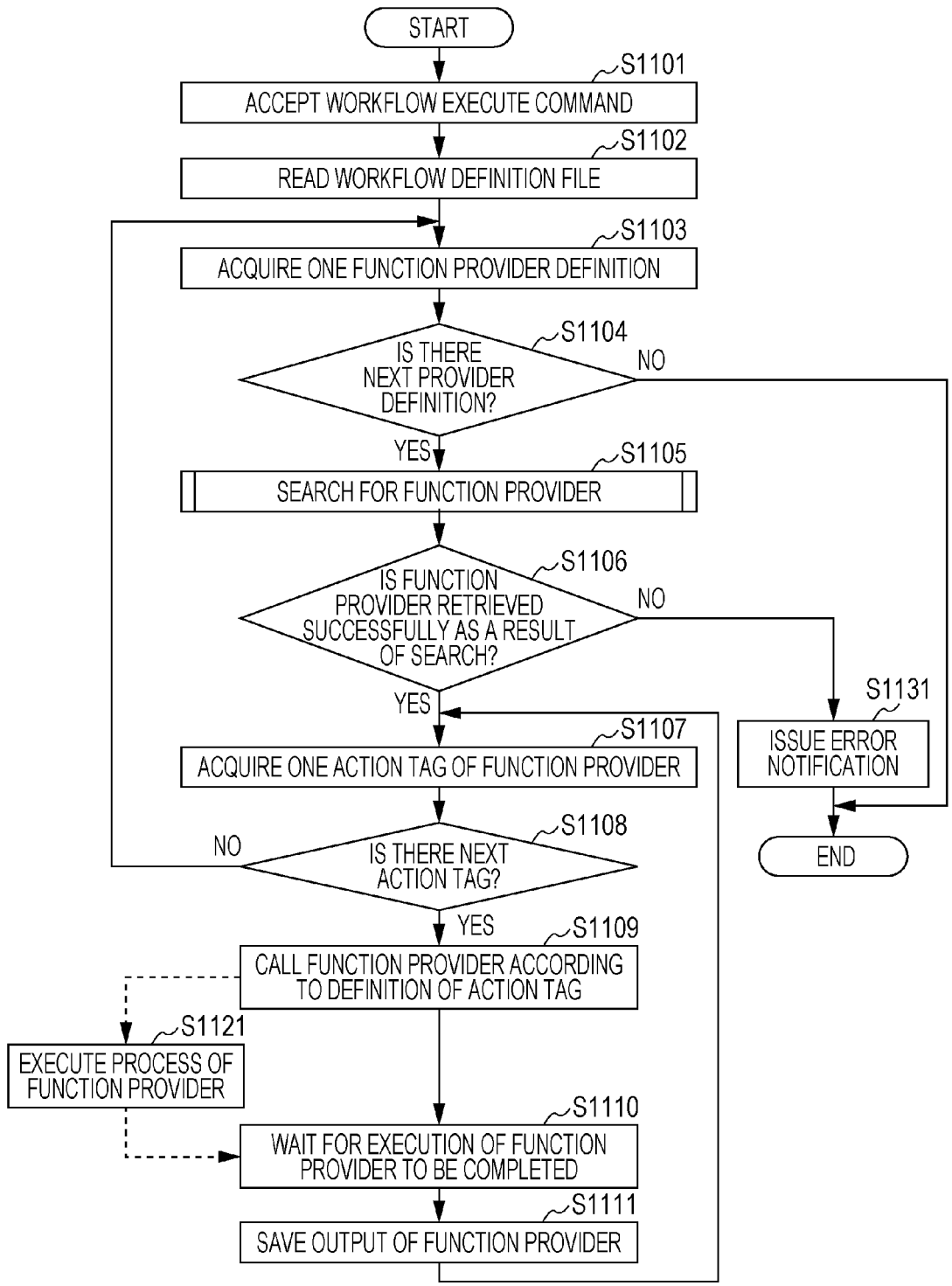
FIG. 11 is a flow chart illustrating a process of executing a workflow in an MFP.

FIG. 11 is a flow chart illustrating a process in S530 to S546 shown in FIG. 5. The process shown in this flow chart is realized by the CPU 211 by loading a program stored in the HDD 214 of the MFP 101 into the RAM 213 and analyzing and executing the loaded program.

First, when the workflow processing unit 430 receives a workflow execution command from a user (S1101), the workflow processing unit 430 reads a workflow definition file 440 corresponding to the received execution command (S1102).

Next, the workflow processing unit 430 acquires, from the workflow definition file 440, one of function provider definitions defined in an FP tag (S1103). Note that function provider definitions are read sequentially one by one in the order of execution. Herein the order of execution is specified by a numerical defined in the "no" element of the FP tag such that smaller numerals indicate earlier execution.

In S1104, the workflow processing unit 430 determines whether there is a definition of a function provider to be executed next. In a case where it is determined that there is a definition of a function provider to be executed next (YES in S1104), the workflow processing unit 430 advances the process to S1105.

In S1105, the workflow processing unit 430 acquires a search condition of a function provider from a FP tag and a Condition tag that is a sub-element of the FP tag, and the workflow processing unit 430 instructs the function provider search unit 423 to search for the function provider. Details of the process of searching the function provider performed by the function provider search unit 423 will be described later with reference to a flow chart shown in FIG. 12.

When the workflow processing unit 430 receives a search result from the function provider search unit 423, the workflow processing unit 430 determines whether the search result indicates that a function provider satisfying the search condition has been obtained (S1106). In a case where it is determined that the search result indicates that no function provider satisfying the search condition has been obtained (NO in S1106), the workflow processing unit 430 issues an error notification (S1131), and ends the process of the workflow.

On the other hand, in a case where it is determined that the search result indicates that a function provider satisfying the search condition has been obtained (YES in S1106), the workflow processing unit 430 advances the process to S1107.

In S1107, the workflow processing unit 430 reads one Action tag, which is a sub-element of the FP tag, from the workflow definition file 440 such that Action tags are read one by one according to the execution order (S1107). Herein the order of execution is specified by a numerical defined in the "no" element of the Action tag such that smaller numerals indicate earlier execution.

Next, in S1108, the workflow processing unit 430 determines whether there is an Action tag to be processed next. In a case where it is determined that there is an Action tag to be processed next (YES in S1108), the workflow processing unit 430 advances the process to S1109.

In S1109, according to the definition of the Action tag the workflow processing unit 430 calls the function provider acquired as the result of the search in S1105. In this step, if a Parameter tag or an Input tag is defined as a sub-element of the Action tag, the workflow processing unit 430 gives an input to the function provider according to the definition thereof. For example, the Input tag 1033 defines the input that is to be given when "doOCR" of the OCR provider is called such that data of the type of "Document" identified by an ID of "foo" is to be received. The data with the ID "foo" is output data of "doScan" of the scan provider defined in the Output tag 1027. Thus, the workflow processing unit 430 transfers data such that the output data of "doScan", held in the workflow processing unit 430, is given as the input data when "doOCR" is called.

The function provider called by the workflow processing unit 430 executes the process according to the instruction (S1121).

The workflow processing unit 430 waits for the called function provider to complete the execution of the process (S1110). When the function provider has completed the execution of the process, the workflow processing unit 430 stores the output from the function provider in the HDD 214 or the RAM 213 to make it possible to use it as the input to another function provider (S1111). For example, the Output tag 1027 defines an output, which occurs when "doScan" of the scan provider is called, such that data of the type "Document" output from the "doScan" is stored as data with an ID of "foo". After the output from the function provider is stored, the workflow processing unit 430 advances the flow to S1107 to acquire an Action tag to be processed next.

On the other hand, in a case where it is determined in S1108 that there is no Action tag to be processed next (NO in S1108), the workflow processing unit 430 determines that all Action tags including the last one have been acquired, and the workflow processing unit 430 advances the process to S1103 to acquire a next function provider definition.

On the other hand, in a case where it is determined in S1104 that there is no definition of a function provider to be executed next (NO in S1104), the workflow processing unit 430 determines that all function providers including the last one have been executed, the workflow processing unit 430 ends the execution of the workflow.

Next, referring to a flow chart shown in FIGS. 12A to 12C, a function provider search process performed by the function provider search unit 423 is described below.

Figure 12B:
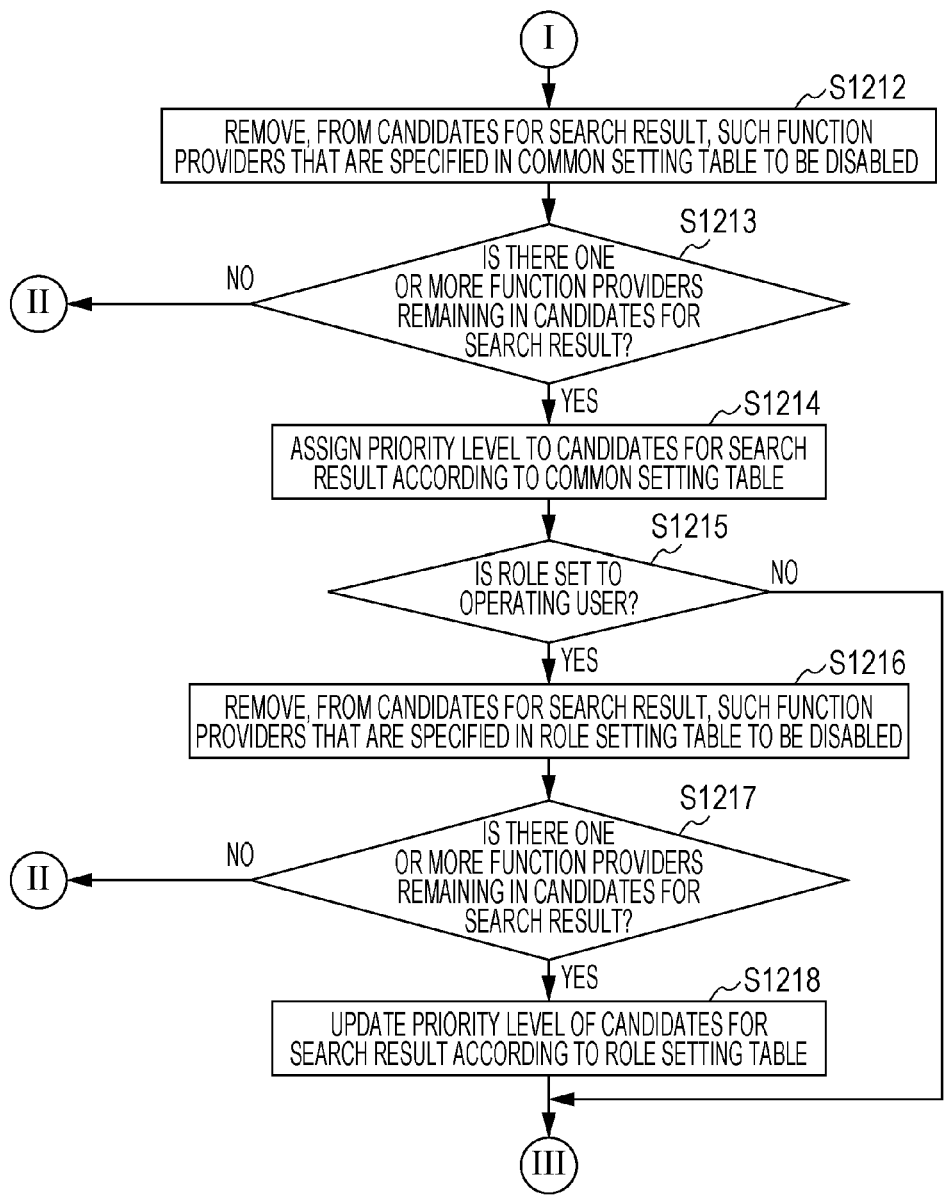
Figure 12C:
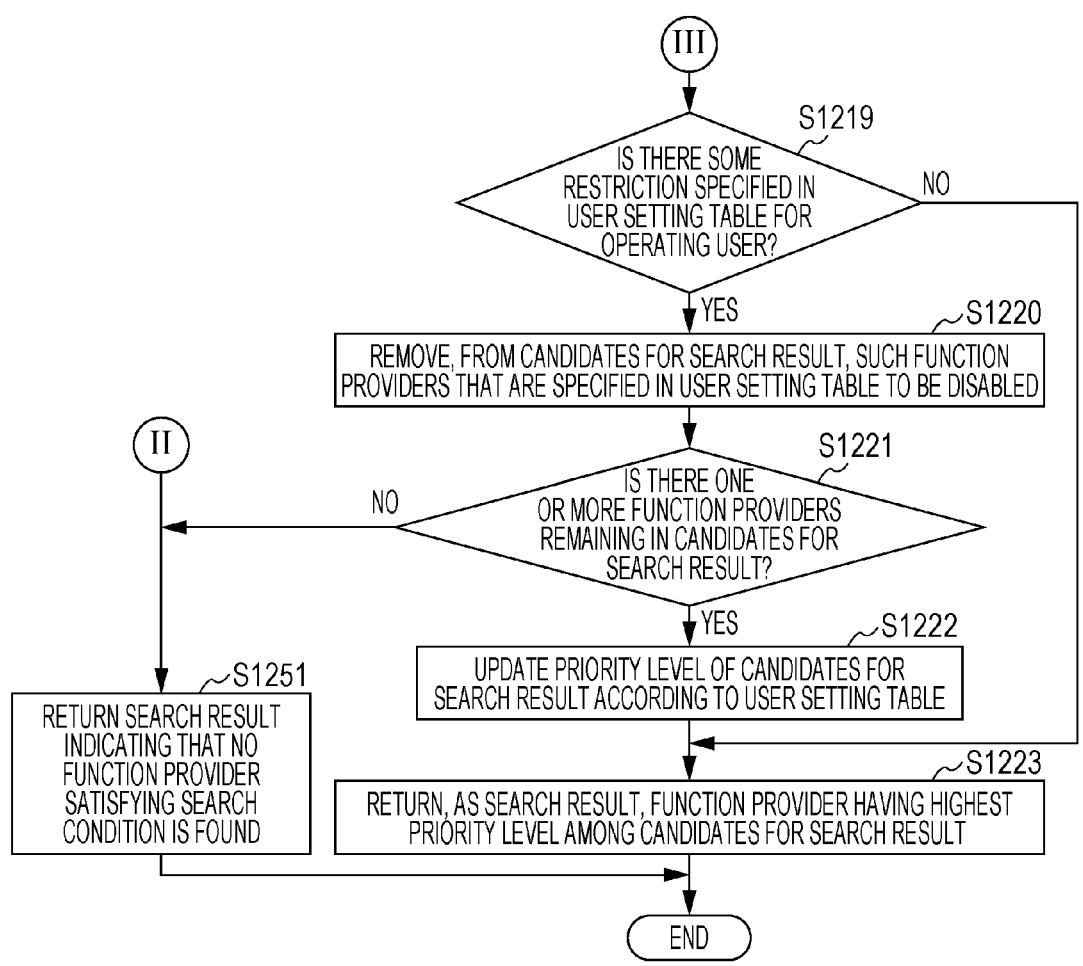

FIGS. 12A to 12C illustrate a flow chart of a process performed in response to calling in S1105 shown in FIG. 11, and this process corresponds to the process performed in S533, S538, and S543 shown in FIG. 5. The process shown in this flow chart is realized by the CPU 211 by loading a program stored in the HDD 214 of the MFP 101 into the RAM 213 and analyzing and executing the loaded program.

First, the function provider search unit 423 receives a function provider search command from the workflow processing unit 430 (S1201). This search command includes a search condition of a function provider defined in the FP tag and the Condition tag which is a sub-element of the FP tag.

Next, the function provider search unit 423 checks how a function provider is specified in the definition of the FP tag attribute (S1202). In a case where it is determined that a function provider is specified by an ID (in a case where "specified by ID" in S1202), the function provider search unit 423 advances the process to S1231.

In S1231, the function provider search unit 423 extracts from the function provider information table 424 such a function provider having a specified ID (that is, a function provider whose ID described in a column of "function provider ID" is the same as the specified ID), and the function provider search unit 423 employs the extracted function provider as a search result candidate.

Next, in S1232, the function provider search unit 423 checks the extraction result. In this case, the function provider is specified by an ID uniquely identifying the function provider, and thus the search result candidate includes one or no function provider.

In a case where it is determined that there is no search result candidate, (NO in S1232), the function provider search unit 423 returns to the workflow processing unit 430 a notification indicating that no function provider satisfying the search condition is obtained as the search result (S1251), and the function provider search unit 423 ends the present process flow.

On the other hand, in a case where it is determined that a function provider is obtained as the search result candidate (YES in S1232), the function provider search unit 423 advances the process to S1205.

On the other hand, in a case where it is determined in S1202 that a function provider is specified by a function type ("specified by a function type" in (S1202)), the function provider search unit 423 advances the process to S1203.

In S1203, the function provider search unit 423 extracts from the function provider information table 424 such function providers of the specified function types (that is, function providers whose function type described in a column of "function type" is the same as the function type), and the function provider search unit 423 employs the extracted function providers as search result candidates.

In S1204, the function provider search unit 423 checks the extraction result obtained in S1203. In this case, the function providers are specified by the function type, and thus there is a possibility that the MFP 101 has a plurality of function providers of the same function type, the extraction result also includes a plurality of function providers. For example, in a case where "SCAN" is specified as the function type, two function providers, that is, a standard scan provider 411 and a simple scan provider 412, are extracted as those whose function type is defined as "SCAN" in the function provider information table 424, and thus these two function providers are extracted as search result candidates.

In a case where it is determined that no search result candidate is obtained, (NO in S1204), the function provider search unit 423 determines that no search result candidate is extracted and returns a search result indicating that there is no function provider satisfying the search condition to the workflow processing unit 430 (S1251). In this case, the present process flow is ended.

On the other hand, in a case where the function provider search unit 423 determines that one or more search result candidates have been extracted, (YES in S1204), the function provider search unit 423 advances the process to S1205.

In S1205, the function provider search unit 423 checks whether an indispensable condition is specified as one of search conditions.

In a case where the function provider search unit 423 determines that no indispensable condition is specified (NO in S1205), the function provider search unit 423 advances the process to S1208.

On the other hand, in a case where the function provider search unit 423 determines that an indispensable condition is specified (YES in S1205), the function provider search unit 423 advances the process to S1206.

In S1206, the function provider search unit 423 narrows down the search result candidates into those function providers that satisfy the indispensable condition, and employs resultant function providers as new search result candidates. The determination as to whether the indispensable condition is satisfied is made by determining whether a value specified as the indispensable condition is described in a column of "values allowed to be set" in the function provider information table 424.

Next, in S1207, the function provider search unit 423 checks whether one or more search result candidates still remain as a result of the narrowing down. In a case where the function provider search unit 423 determines that no search result candidate remains (NO in S1207), the function provider search unit 423 returns a search result indicating that there is no function provider satisfying the search condition to the workflow processing unit 430 (S1251), and the function provider search unit 423 ends the present process flow.

On the other hand, in a case where the function provider search unit 423 determines that there are remaining search result candidates, (YES in S1207), the function provider search unit 423 advances the process to S1208.

In S1208, the function provider search unit 423 checks whether an optional condition is specified as one of search conditions. In a case where it is determined that no optional condition is specified (NO in S1208), the function provider search unit 423 advances the process to S1212.

On the other hand, in a case where the function provider search unit 423 determines that an optional condition is specified (YES in S1208), the function provider search unit 423 advances the process to S1209.

In S1209, the function provider search unit 423 narrows down the search result candidates into those function providers that satisfy the optional condition, and employs resultant function providers as new search result candidates. The determination as to whether the optional condition is satisfied is made by determining whether a value specified as the optional condition is described in a column of "values allowed to be set" in the function provider information table 424.

Next, in S1210, the function provider search unit 423 checks whether one or more search result candidates still remain as a result of the narrowing down. In a case where the function provider search unit 423 determines that there are remaining search result candidates (YES in S1210), the function provider search unit 423 advances the process to S1212.

On the other hand, in a case where it is determined that no search result candidate remains (NO in S1210), the function provider search unit 423 advances the process to S1211.

In S1211, the function provider search unit 423 discards the narrowing-down result obtained in S1209 and returns the search result candidate to the content obtained immediately before the S1209 (S1211). That is, the optional condition is not used as the narrowing-down condition. The processing flow then proceeds to S1212.

In S1212, the function provider search unit 423 removes, from the search result candidates, function providers specified as being disabled in the common setting table of the function provider setting table 425.

Next, in S1213, the function provider search unit 423 checks whether one or more search result candidates remain as a result of the removal performed in S1212. In a case where the function provider search unit 423 determines that no search result candidate remains (NO in S1213), the function provider search unit 423 returns a search result indicating that there is no function provider satisfying the search condition to the workflow processing unit 430 (S1251), and the function provider search unit 423 ends the present process flow.

However, in a case where it is determined that there are remaining search result candidates, (YES in S1213), the function provider search unit 423 advances the process to S1214.

In S1214, the function provider search unit 423 defines priority levels for each search result candidate according to the priority order defined for each function type in the common setting table of the function provider setting table 425.

Next, the function provider search unit 423 checks whether setting of a role of a user who has issued a command to execute the workflow is described in the role setting table of the function provider setting table 425 (S1215). In a case where it is determined that the setting of the role is not described in the role setting table (NO in S1215), the function provider search unit 423 advances the process to S1219.

On the other hand, in a case where the function provider search unit 423 determines that the setting of the role is described in the role setting table (YES in S1215), the function provider search unit 423 advances the process to S1216.

In S1216, the function provider search unit 423 removes, from the search result candidates, function providers specified as being disabled in the role setting table of the function provider setting table 425. For example, in FIG. 9B, "OCR_WEB" is disabled for a role of "Guest Users", and thus for a user whose rose is "Guest Users", Web OCR provider 414 is removed from the OCR provider search result. That is, for a user whose role is "Guest Users", it is not allowed to use the Web OCR provider 414 in the execution of the workflow.

Next, in S1217, the function provider search unit 423 checks whether one or more search result candidates remain as a result of the removal performed in S1216. In a case where it is determined that there is no remaining search result candidate (NO in S1217), the function provider search unit 423 returns a search result indicating that there is no function provider satisfying the search condition to the workflow processing unit 430 (S1251), and the function provider search unit 423 ends the present process flow.

On the other hand, in a case where it is determined that there is one or more remaining search result candidates (YES in S1217), the function provider search unit 423 advances the process to S1218.

In S1218, the function provider search unit 423 updates the priority levels assigned in S1214 for each search result candidate according to the priority order defined for each function type in the role setting table of the function provider setting table 425.

Next, the function provider search unit 423 checks whether setting of a user who has issued a command to execute the workflow is described in the user setting table of the function provider setting table 425 (S1219). In a case where it is determined that the setting of the user is not described in the user setting table (NO in S1219), the function provider search unit 423 advances the process to S1223.

On the other hand, in a case where the function provider search unit 423 determines that the setting of the user is described in the user setting table (YES in S1219), the function provider search unit 423 advances the process to S1220.

In S1220, the function provider search unit 423 removes, from the search result candidates, function providers specified as being disabled in the user setting table of the function provider setting table 425.

Next, in S1221, the function provider search unit 423 checks whether one or more search result candidates remain as a result of the removal performed in S1220. In a case where it is determined that there is no remaining search result candidate (NO in S1221), the function provider search unit 423 returns a search result indicating that there is no function provider satisfying the search condition to the workflow processing unit 430 (S1251), and the function provider search unit 423 end the present process flow.

On the other hand, in a case where it is determined that there is one or more remaining search result candidates (YES in S1221), the function provider search unit 423 advances the process to S1222.

In S1222, the function provider search unit 423 updates the priority order for the search result candidates according to the priority order defined for each function type in the user setting table of the function provider setting table 425. In the example shown in FIG. 9A, the priority order of the function type "SCAN" is set as "NORMAL_SCAN, EASY_SCAN". However, in FIG. 9C, a user "tanaka" is assigned "EASY_SCAN, NORMAL_SCAN". Furthermore, in FIG. 9B, the priority order of the function type "SCAN" is not defined in the role setting table. Therefore, for a user assigned no priority order in the role setting table and the user setting table, the priority is given in the order "standard scan provider 411, simple scan provider 412". On the other hand, for the user "tanaka", the priority is given in the order "simple scan provider 412, standard scan provider 411". The processing flow then proceeds to S1223.

In S1223, the function provider search unit 423 selects a function provider with a highest priority from the search result candidates and returns the selected function provider as a search result to the workflow processing unit 430, and the function provider search unit 423 ends the present process flow.

The techniques described above with reference to specific embodiments make it possible to provide a function of executing a process sequence including a plurality of steps by combining a plurality of function providers, and a function of dynamically determining, when the process sequence is executed, function providers used in the process sequence.

Thus, the techniques disclosed herein make it possible to realize the flexible extension function using function providers serving as extension programs.

For example, in realizing a function of "scanning, performing OCR, and transmitting a result", there is a possibility that a user may want to switch an OCR engine used. For example, let it be assumed that when a user is using an OCR engine on the MFP 101, the user wants to switch the OCR engine to one having a higher character recognition performance. In the following description, let it be assumed by way example that an OCR function provided by an external Web server is used for a one-month trial period, and if it turns out that this OCR function is good enough then this OCR function will be used further, but if it turns out that this OCR function is not good enough, then the OCR function returns to the previous OCR function on the MFP 101 or another OCR function is tried.

In a case where an application is used, to switch the OCR engine to one provided by an external Web server, it is necessary to modify the application program. In a case where the OCR engine is returned to the previous one provided on the MFP 101 after the one-month trial period it is necessary to return the application program to the previous one used before the trial period. Alternatively, when the application program is modified, it is necessary to add a switch for switching the OCR engine. In a case where still another OCR function is tried, it is necessary to further modify the application program, which needs a further job.

In the case of a conventional workflow processing system not using the techniques disclosed here, calling of processes is controlled only in a workflow definition file. Therefore, to switch the OCR engine, it is necessary to modify the workflow processing program to be capable of calling an OCR provided by an external Web server, and further prepare a plurality of workflow definition files. That is, in addition to an existing workflow definition file defining a workflow of "scanning, performing OCR, and transmitting a result", another workflow definition file is produced to define a workflow of "scanning, performing OCR using an external Web server, and transmitting a result". Furthermore, it is necessary to change the workflow definition file between the one-month trial period and the following period, which needs a very troublesome job. It may be possible to produce a complicated definition file that allows it to change the OCR engine. However, in practice, it is very difficult for an end user to produce such a complicated definition file.

In contrast, in the workflow processing system according to the technique of the present disclosure, it is possible to easily change the OCR engine. The workflow definition file defines the content of the process individually for each function type such as execution of scan provider", "executing of OCR provider, "execution of transmission provider", and so on. To change the OCR engine, an OCR provider corresponding to a new OCR engine is added to the MFP 101. Thereafter, the common setting table of the function provider setting table 425 is modified in terms of the priority order of the function type of OCR. In this case, it is not necessary to make any change in terms of the existing OCR provider, the workflow processing unit 430, and the workflow definition file. When it is desired to return the OCR engine to the previous one provided on the MFP 101 after the end of the trial period, it is allowed to return the OCR engine to the previous one simply by changing the priority order of the OCR.

Now, another example is described below. In this example, it is assumed by way of example that a function of "scanning, performing OCR, and transmitting result" is realized such that it is allowed to change the scan setting screen depending on a user. For example, a simple scan setting screen is displayed for a user who is not familiar with use of the MFP 101, while a standard scan setting screen is displayed for an average user.

In a case where this function is realized using application programs, two application programs are necessary. That is, an application program in which the simple scan setting screen is used, and an application program in which the standard scan setting screen is used are necessary even when there is no difference in the function except for the scan setting screen. Furthermore, when the two application programs are prepared, it is necessary to correctly select one of the two application programs depending on the user, which needs a troublesome job.

In the case of a conventional workflow processing system not using the techniques disclosed here, to change the scan setting screen depending on the user, it is necessary to prepare a plurality of workflow definition files. That is, following two workflow definition files are necessary: a workflow definition file in which a simple scan setting screen is used; and a workflow definition file in which a standard scan setting screen is used. In a case where these two workflow definition files are prepared, it is necessary to correctly select one of the two workflow definition files depending on the user, which needs a troublesome job. Furthermore, it is very difficult for an end user to produce such a complicated definition file so as to make it possible to change the scan setting screen.

In contrast, in the workflow processing system according to the technique of the present disclosure, it is possible to easily switch the scan setting screen depending on the user. The workflow definition file defines the content of the process individually for each function type such as execution of scan provider", "executing of OCR provider, "execution of transmission provider", and so on. When a user wants to switch the scan setting screen, the user changes the priority order of the function type of "SCAN" in the user setting table of the function provider setting table 425. For those users for whom the priority order of "SCAN" is not set in the user setting table, the priority order of "SCAN" defined in the common setting table is used.

As described above, in the workflow processing system according to the technique of the present disclosure, a process sequence is defined in the workflow definition file in which function types of function providers used are specified, and specific function providers used are dynamically determined by the function provider management unit 420 when the process sequence is actually executed, and thus it becomes possible to realize the flexible extension function.

The embodiments of the present disclosure have been described above in which it is assumed by way of example the information processing apparatus is an MFP. However, in the present disclosure, the information processing apparatus is not limited to the MFP, but the present disclosure may be applied to other types of information processing apparatuses. The present disclosure may be applied to any apparatus as long as it is allowed to add a function provider serving as an extension program having an interface defined for each function type, and it is allowed to execute a workflow in which functions provided by a plurality of function providers are combined. For example, the present disclosure may be applied even to a household electrical appliance such as a television set, a car navigation apparatus, etc.

Note that the data structure of each data described above and the content thereof are not limited to the examples described above, but the data structure and the content may be varied depending on the use, the purpose, and the like.

Although the present disclosure has been described above with reference to specific embodiments, the present disclosure may be embodied in many forms such as a system, an apparatus, a method, a program, a storage medium, etc. The present disclosure may be applied to a system including a plurality of devices or may be applied to an apparatus including only a single device.

Also, note that two or more embodiments described above may be combined, and any such a combined embodiment also falls into the scope of the present disclosure.

Other Embodiments

The present disclosure may also be practiced such that a program for realizing one or more functions described above is supplied to a system or an apparatus via a storage medium or a network, and, in the system or the apparatus, one or more processors read out the program and execute it. The present disclosure may also be practiced by a circuit (such as an application-specific integrated circuit (ASIC)) to realize one or more functions described above.

The present disclosure may be applied to a system including a plurality of devices or may be applied to an apparatus including only a single device.

Note that the present disclosure is not limited to the details of the embodiments described above, but various modifications (including combinations of embodiments) are possible without departing from the spirit and the scope of the present disclosure. Any combination of embodiments or modifications falls within the scope of the present disclosure.

According to the present disclosure described above with reference to embodiments, it is possible to flexibly realize an extension function added to an information processing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-120996, filed Jun. 16, 2015, which is hereby incorporated by reference herein in its entirety.

What is claimed is:

1. An information processing apparatus capable of adding a function by an extension program, the information processing apparatus comprising:
a registration unit configured to register information on the extension program having an interface defined for each type of function;
a setting unit configured to set a use condition of the extension program;
an execution unit configured to execute a process sequence by combining a plurality of extension programs according to a definition file defining the process sequence including a plurality of steps; and
a determination unit configured to dynamically determine, when the process sequence is executed by the execution unit, extension programs that execute the respective steps of the process sequence according to information on the extension programs registered in the registration unit and the use conditions of the extension program set in the setting unit.

2. The information processing apparatus according to claim 1, wherein the extension program use condition includes a priority order of extension programs defined for each function type.

3. The information processing apparatus according to claim 2, wherein the extension program use condition includes setting for each function type in terms of whether extension programs are enabled or disabled.

4. The information processing apparatus according to claim 2, wherein the extension program use condition includes a use condition for each role of a user who issues an instruction to execute the process sequence.

5. The information processing apparatus according to claim 1, wherein the extension program use condition includes a use condition for each user who issues an instruction to execute the process sequence.

6. The information processing apparatus according to claim 1,
wherein the definition file includes information specifying each extension program that executes a step in the process sequence by using information identifying the function type or the extension program for each step, and
wherein the determination unit determines, for each step, an extension program that executes the step by using information identifying the function type or the extension program.

7. The information processing apparatus according to claim 6,
wherein the definition file is capable of specifying, as for a step executed by an extension program specified by information identifying a function type, a condition of a function to be provided by an extension program that executes the step, and
wherein the determination unit determines, as for a process for which a condition of a function is specified in the definition file, an extension program that executes the step by using the condition of the function.

8. The information processing apparatus according to claim 7,
wherein the definition file is capable of specifying one or both of a first condition and a second condition as the condition of the function for each step, the first condition indicating a condition to be satisfied by the extension program that executes the step, the second condition indicating a condition to be determined with high priority as the extension program that executes the step, and
wherein the determination unit determines, as for a step for which the first condition is specified, an extension program that executes the step among extension programs satisfying the first condition, while the determination unit determines, as for a step for which the second condition is specified, an extension program satisfying the second condition with high priority as the extension program that executes the step.

9. The information processing apparatus according to claim 1, wherein the information processing apparatus is an image forming apparatus.

10. A method of controlling an information processing apparatus capable of adding a function by an extension program, the method comprising:
registering information on the extension program having an interface defined for each type of function;
setting a use condition of the extension program;
executing a process sequence by combining a plurality of extension programs according to a definition file defining the process sequence including a plurality of steps; and
dynamically determining, when the process sequence is executed, extension programs that execute the respective steps of the process sequence according to registered information on the extension programs and the set use conditions of the extension program.

11. A non-transitory computer-readable medium storing a program to cause a computer to perform a method of controlling an information processing apparatus capable of adding a function by an extension program, the method comprising:
registering information on the extension program having an interface defined for each type of function;
setting a use condition of the extension program;
executing a process sequence by combining a plurality of extension programs according to a definition file defining the process sequence including a plurality of steps; and
dynamically determining, when the process sequence is executed, extension programs that execute the respective steps of the process sequence according to registered information on the extension programs and the set use conditions of the extension program.

* * * * *